(12) United States Patent
Krantz

(10) Patent No.: US 6,259,241 B1
(45) Date of Patent: Jul. 10, 2001

(54) PROJECTED DISPLAY FOR PORTABLE SENSOR INDICATING THE LOCATION OF A DETECTED HIDDEN OBJECT BEHIND A SURFACE

(75) Inventor: Norman L. Krantz, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 0 days.

(21) Appl. No.: 09/338,119

(22) Filed: Jun. 22, 1999

(51) Int. Cl.[7] .............................. G01V 3/08; G01V 3/165; G01R 19/00
(52) U.S. Cl. ............................. 324/67; 324/156
(58) Field of Search ........................ 324/67, 326, 133, 324/529, 530, 556, 156, 157

(56) References Cited

U.S. PATENT DOCUMENTS

| 3,805,155 | * | 4/1974 | Tsuda et al. ................. 324/133 |
| 4,099,118 | * | 7/1978 | Franklin et al. ................ 324/67 X |
| 4,464,622 | * | 8/1984 | Franklin ........................ 324/67 |
| 4,536,705 | * | 8/1985 | Hayes .......................... 324/556 |
| 5,438,265 | * | 8/1995 | Eslambolchi et al. ........ 324/67 X |
| 5,917,314 | * | 6/1999 | Heger et al. ................... 324/67 |

FOREIGN PATENT DOCUMENTS 2 188 432   9/1987 (GB) ............................ G01V/3/00

\* cited by examiner

Primary Examiner—Gerard R. Strecker
(74) Attorney, Agent, or Firm—Skjerven Morrill MacPherson LLP; Norman R. Klivans; Christopher B. Allenby

(57) ABSTRACT

A display in a portable detector unit (e.g., a handheld "stud sensor") projects a pattern of light onto a surface beneath which a hidden object is located. The pattern represents the location of a sensed characteristic of the object with respect to the surface. The pattern may include a single line or a plurality of lines, and may be projected in one or more directions.

51 Claims, 13 Drawing Sheets

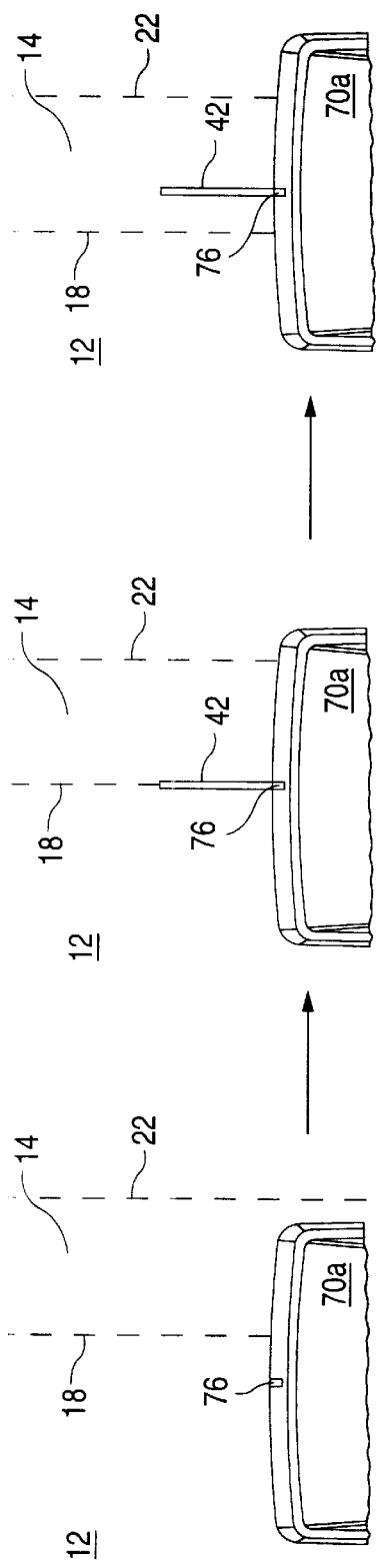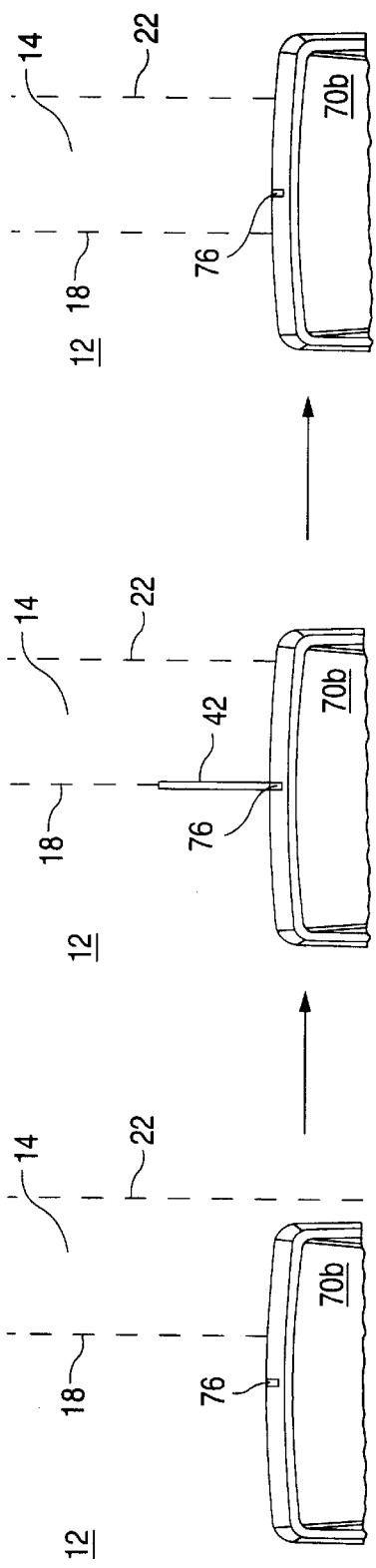

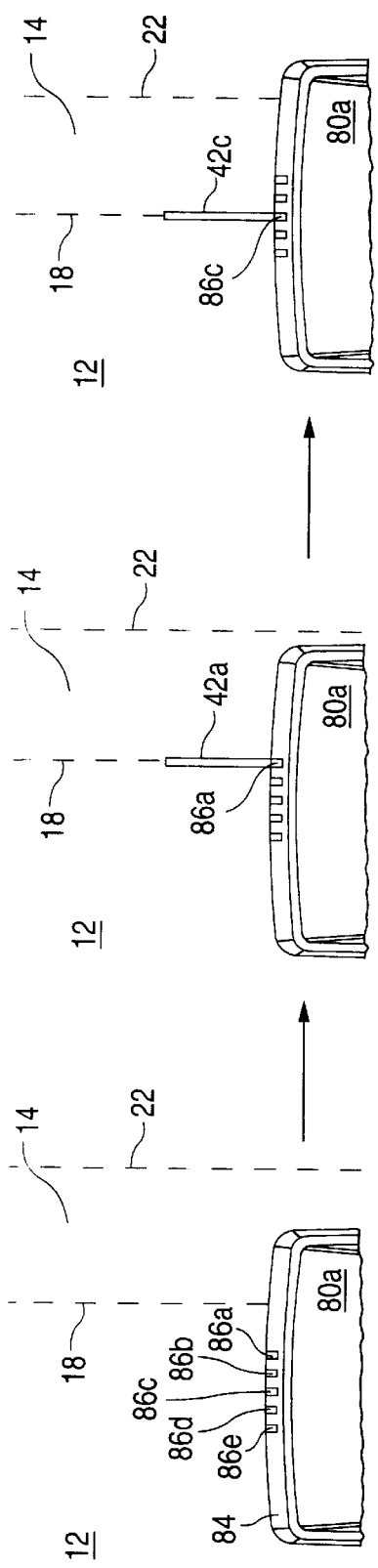
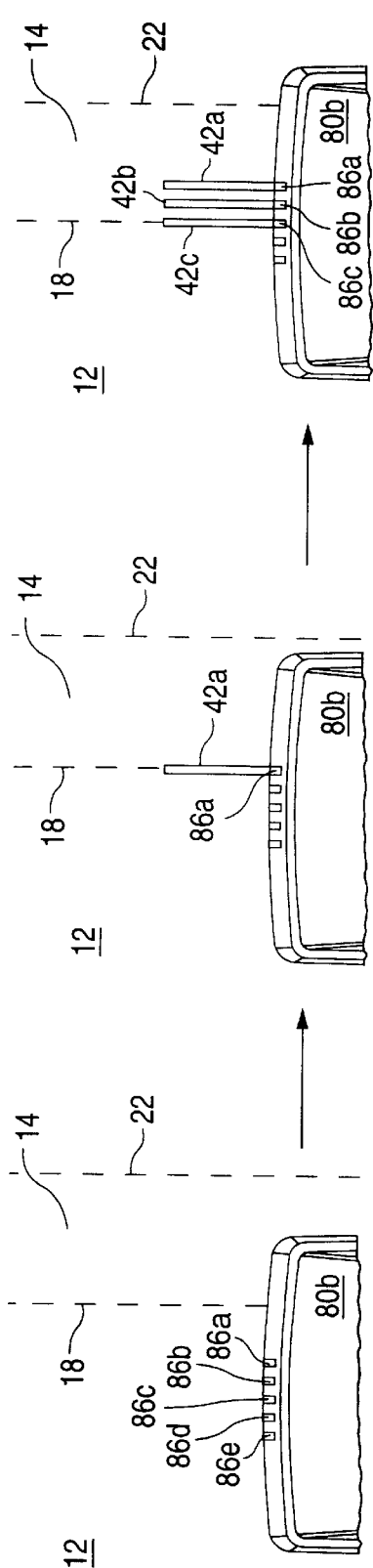

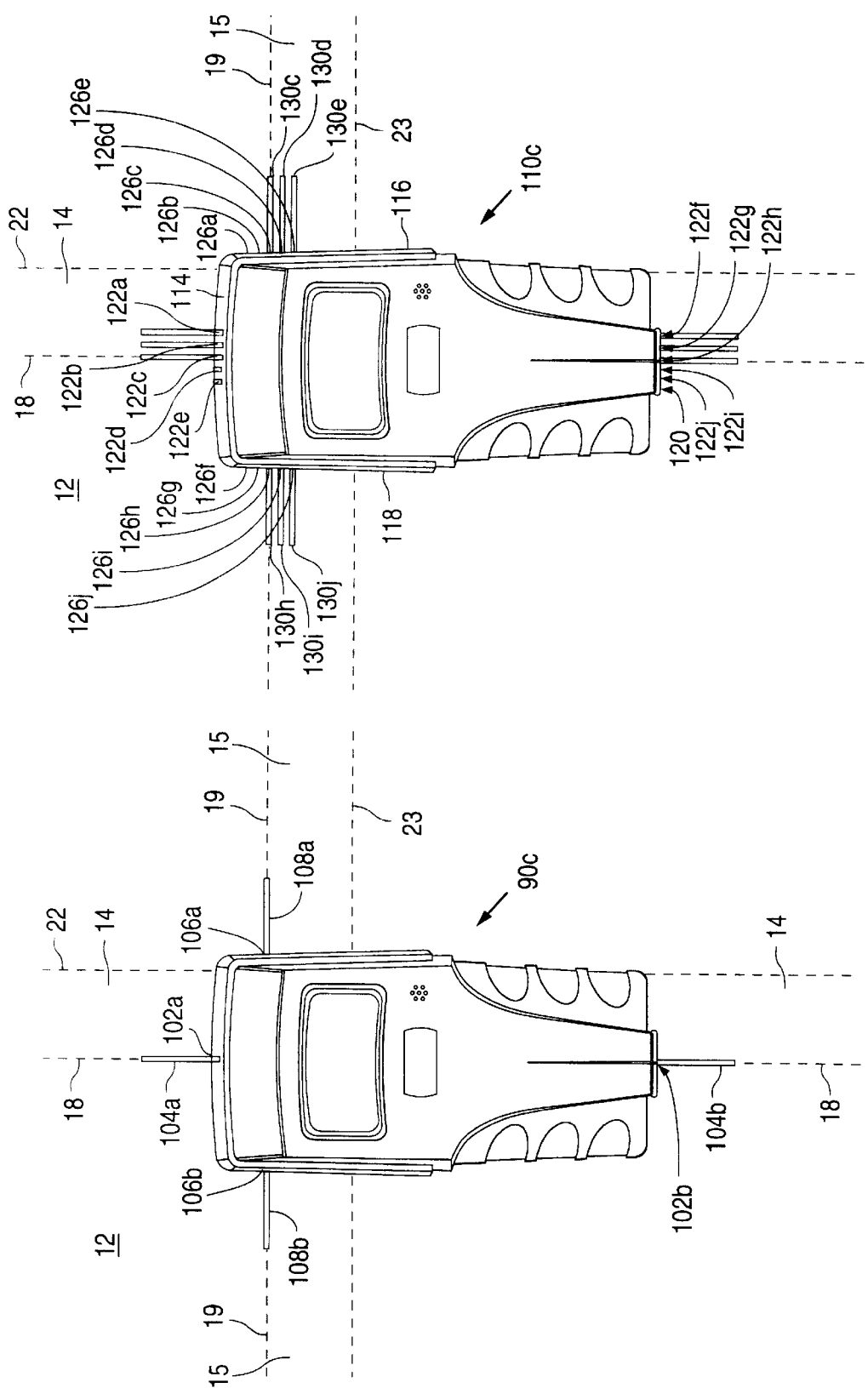

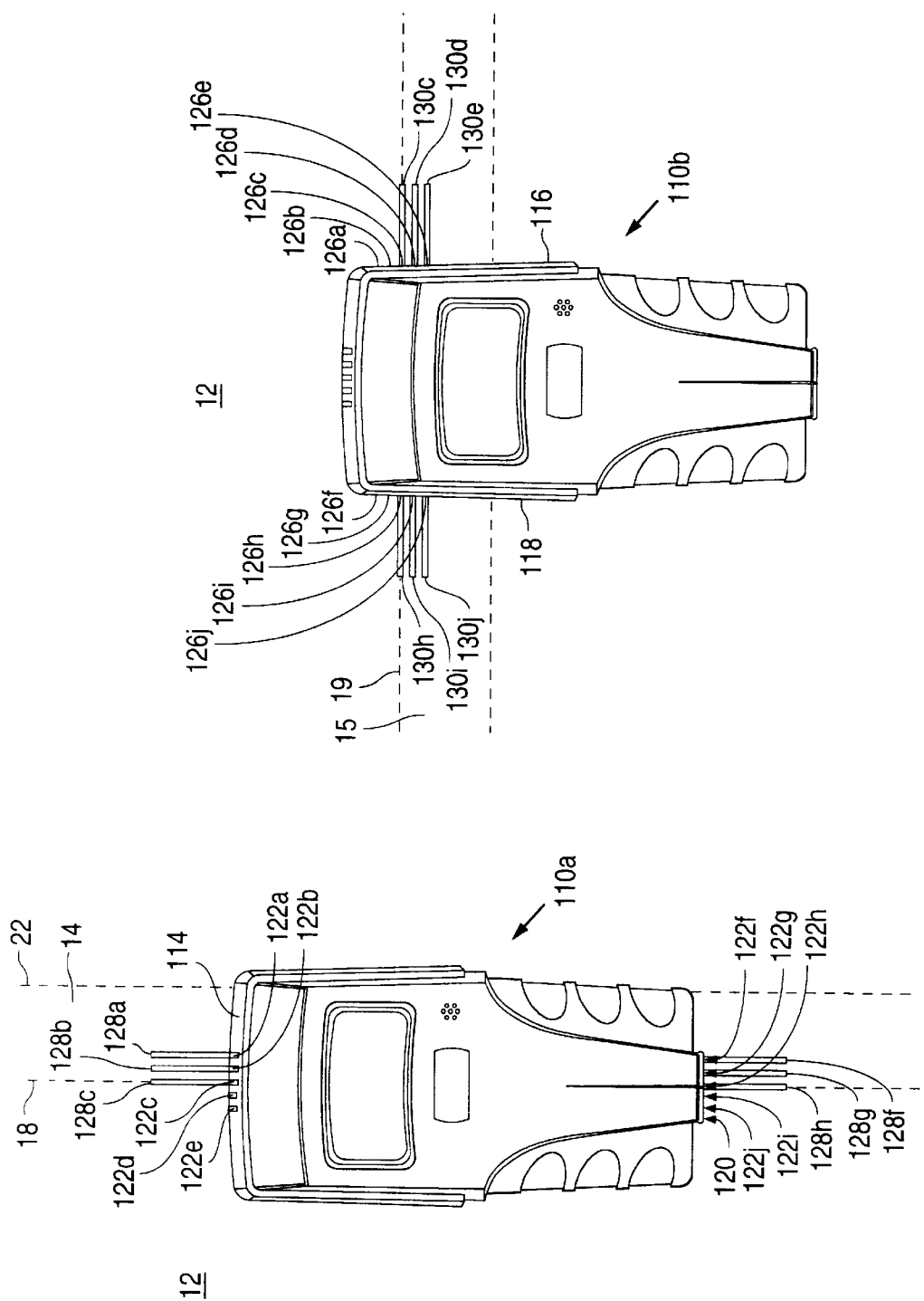

PROJECTED DISPLAY FOR PORTABLE SENSOR INDICATING THE LOCATION OF A DETECTED HIDDEN OBJECT BEHIND A SURFACE

BACKGROUND

1. Field of Invention

The present invention relates to user displays in portable detector units, and in particular, to displays for indicating the location of a detected hidden object.

2. Related Art

Portable sensors, including handheld detector units, that are used to locate hidden objects are generally well known. U.S. Pat. Nos. 4,099,118 and 4,464,622, which are incorporated herein by reference, disclose detector units (e.g., "stud sensors" and alternating current detectors) that identify a hidden object's position behind, for example, a wall. Some detectors identify the hidden object by measuring a capacitance change in one or more sensor elements within the detector unit as the user moves the unit across the wall over the hidden object. Such objects include wooden structural studs, pipes, and other metal and nonmetal objects such as wiring.

Other well-known handheld detector units contain sensor element and detecting circuit combinations that measure electromagnetic field changes. Some of these detector types identify, for example, wires carrying alternating current. Others of these detector types identify, for example, objects that effect a local magnetic field, such as masses of metal or gas lines.

FIG. 1 illustrates a typical application in which a user holds a detector unit 10 against wall 12. The user moves detector 10 transversely, as indicated by the arrows, to detect an object hidden from view behind wall 12, such as framing stud 14. Circuits within detector unit 10 display the sensed information on display 16.

Handheld detector units typically display their sensed indications using a visual display, such as display 16. Sensor visual displays include light-emitting diodes (LEDs) and liquid crystal displays (LCDs) in various configurations of one or more elements. For example, the National brand model number EZ380B (a Japanese manufactured product) includes a somewhat arrow-shaped LED display. Another detector sold under the name "Intellisensor," made by The Stanley Works in New Britain, Conn., uses a vertical LED display. In addition, copending and commonly assigned U.S. patent application Ser. No. 09/134,157, filed Aug. 14, 1998 and incorporated herein by reference, and copending commonly assigned U.S. patent application Ser. No. 08/694,955 (U.S. Pat. No. 5,917,314, issued Jun. 29, 1999), filed Aug. 8, 1996 and incorporated herein by reference, disclose several LCD and LED display configurations. Detector unit visual displays are typically designed to assist the detector user in determining some characteristic of a sensed object, such as an edge or center. Referring again to FIG. 1, for example, display 16 may indicate stud 14's edge 18, a center position 20 located between edge 18 and edge 22, both edges 18 and 22, or other representations of stud 14.

Handheld detector LED or LCD displays are typically mounted in the detector unit housing. Thus the display is displaced both laterally and in depth from the surface under which the detected object is located. Furthermore, users often operate handheld detectors at skewed angles and in unusual positions such as when searching for objects that are behind ceilings, floors, corners, etc. For example, in FIG. 1, if stud 14 is located behind a wall that is close to a large visual obstruction, such as a water heater tank, the user will have difficulty seeing display 16. Even if display 16 is visible, the skewed viewing angle requires the user to make a visual angular estimate of the hidden object's location behind the wall's surface, based on the display's position in the detector unit housing. What is desired, therefore, is a way to improve the way detector information is displayed to the user.

SUMMARY

In accordance with the invention, a handheld detector projects a visible pattern onto the surface behind which a detected object is located. The projected pattern represents one or more predetermined characteristics of the detected object. The predetermined characteristic includes, but is not limited to, an edge, a position between two edges, a center position between two edges, a characteristic of the object's mass, or an electromagnetic characteristic emitted or affected by the object.

In one embodiment of the invention, a narrow aperture is defined in one end of the detector unit housing. When the detector unit's sensing circuit detects a hidden object, the sensing circuit signals an activating circuit that energizes a light source within the detector housing. A portion of the light from the light source passes through the aperture and thereby projects a line onto the surface beneath which the detected object is located.

In some embodiments, the detector unit includes two or more aperture and light source combinations to provide additional indications of the hidden object's position and orientation. In some embodiments, light is projected through one or more apertures in a single direction, while in other embodiments light is projected in opposite directions. And in some embodiments light is projected along two axes of the detector unit so as to indicate, for example, the intersection of two hidden objects. In still other embodiments, the user manually optionally displays light patterns on the concealing surface upon perceiving an alerting signal from the detector unit.

Some embodiments of the invention are combined with stud sensor circuits to make handheld "stud sensors" such as those used in the construction industry. However, the invention may be combined with other portable detector units designed for both indoor and outdoor use in detecting many different types of hidden or buried objects.

BRIEF DESCRIPTION OF THE DRAWINGS

FIGS. 5A, 5B and 5C sequentially illustrate an application of an embodiment of the invention displaying the location of a framing stud.

FIGS. 6A, 6B, and 6C sequentially illustrate an application of an embodiment of the invention displaying the location of an edge of a framing stud.

FIGS. 8A, 8B, and 8C sequentially illustrate an application of an embodiment of the invention displaying the location of an edge of a framing stud.

FIGS. 9A, 9B, and 9C sequentially illustrate an application of an embodiment of the invention displaying the location of a framing stud.

FIG. 14 is a plan view showing an application of an embodiment of the invention displaying the locations of two edges of intersecting framing studs.

FIG. 17 is a plan view of an embodiment of the invention displaying the location of a framing stud.

FIG. 18 is a plan view of an embodiment of the invention displaying the location of a framing stud.

FIG. 19 is a plan view showing an application of an embodiment of the invention displaying the locations of two edges of intersecting framing studs.

DETAILED DESCRIPTION

Figure 1:
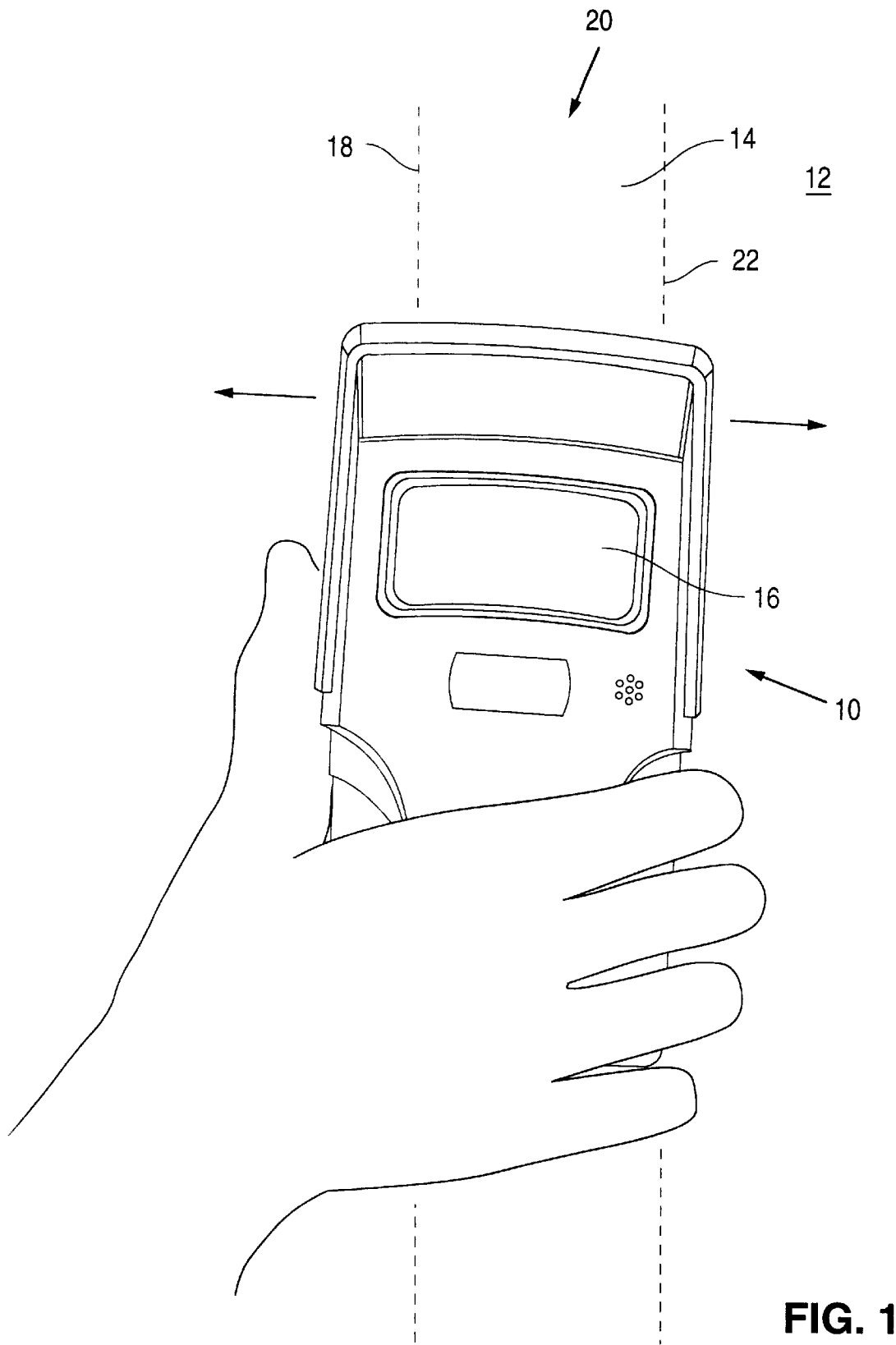
FIG. 1 illustrates a typical application of a handheld sensor.

Identically numbered elements in the drawings accompanying the following description represent similar structures.

In accordance with the invention, a handheld detector unit projects a visible pattern onto the surface behind which a sensed object is located. The projected pattern, such as a line, represents a characteristic of the detected object, such as an edge, a position between two edges, or the object's mass.

Figure 2A:
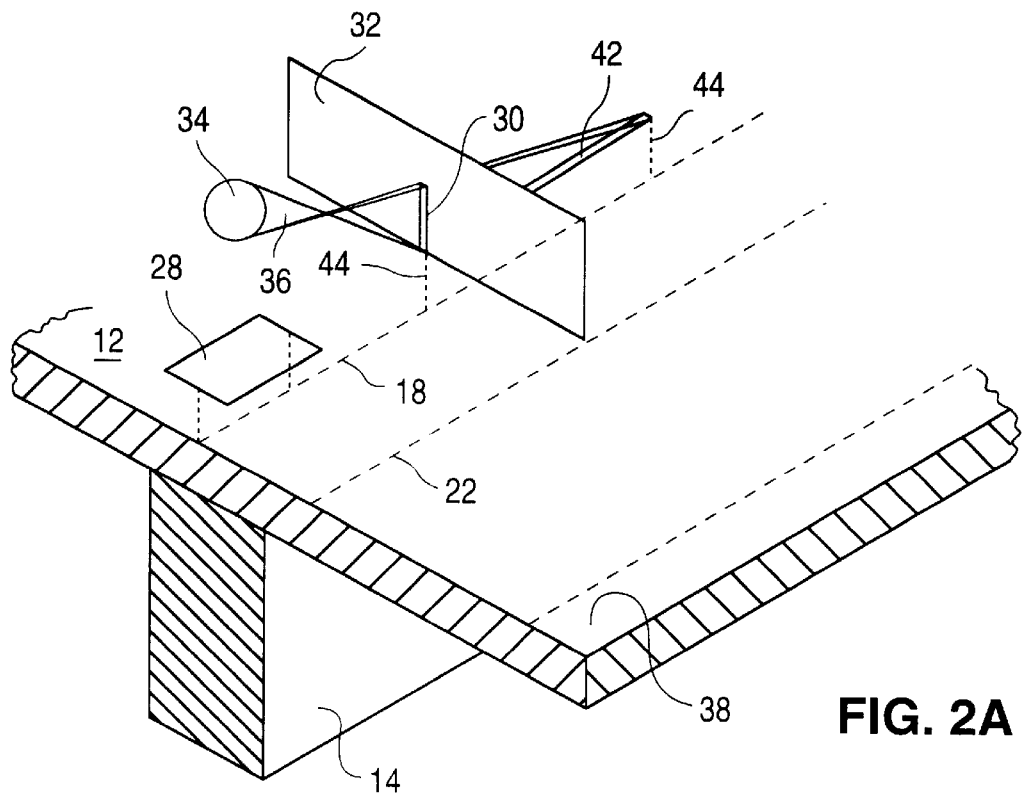
FIGS. 2A and 2B are perspective views illustrating operating principles of embodiments of the invention.
Figure 2B:
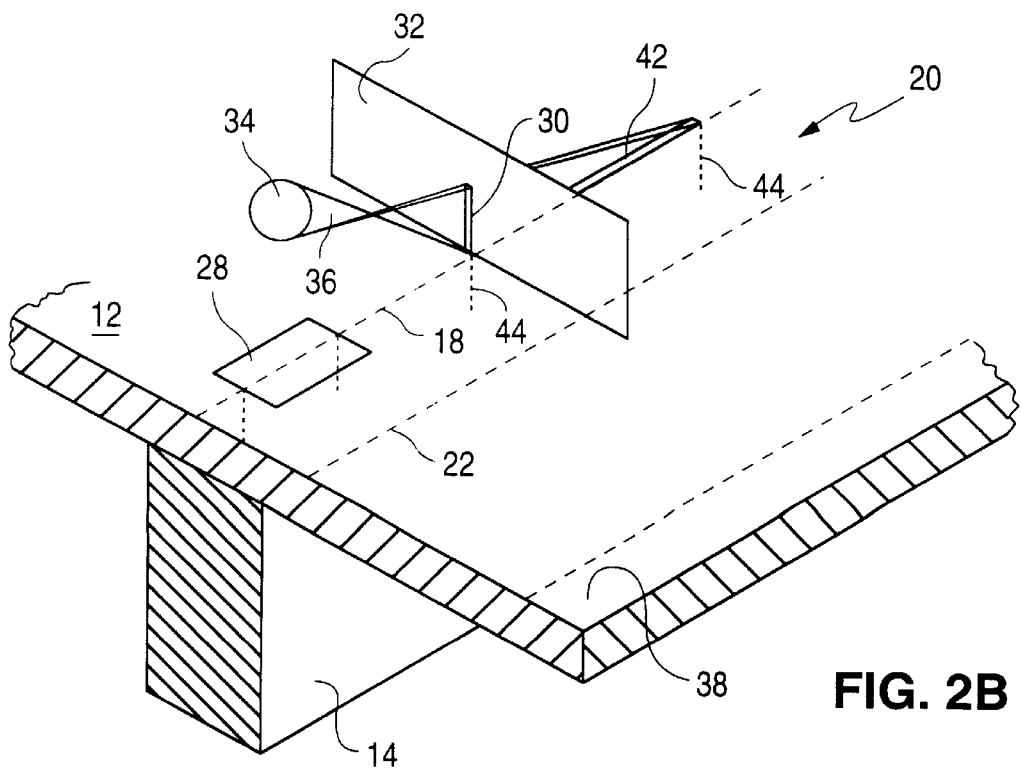

FIGS. 2A and 2B illustrate an embodiment of the invention and its operation. FIG. 2A shows sensor element array 28, containing one or more sensor elements, that is coupled to, for example, a sensing circuit (FIG. 3) used to provide a signal indicating the presence of a characteristic of a sensed object.

Also shown is transparent aperture 30 defined in mask 32. Mask 32 is opaque and is a part of a handheld detector unit housing. Aperture 30 may be an open slot, or may be covered to prevent foreign material, such as dust, from entering the detector housing. In addition, in some embodiments aperture 30 may hold imaging optics (e.g., lenses).

Also shown is light source 34. In some embodiments light source 34 is a conventional LED bright enough to project a visible pattern onto a surface. In other embodiments, light source 34 is a conventional light bulb. In still other embodiments light source 34 is a laser. As shown in FIG. 2A, light 36 radiates directly from source 34 to aperture 30. In other embodiments, light 36 is directed through one or more optical elements (not shown) such as a lens, prism, or light pipe (e.g., optical fiber).

As shown in FIG. 2A, light 36 is directed from light source 34 through aperture 30 and is incident on surface 38 of wall 12. Light 36 illuminates a pattern on surface 38 that corresponds to aperture 30's shape; as shown, this pattern is line 42. Other embodiments project other patterns. FIG. 2A shows line 42 projected on surface 38 at a position corresponding to stud 14's edge 18 located behind wall 12. Thus in some embodiments, as the user moves sensor element array 28 across surface 38, a detecting circuit (FIG. 3) detects edge 18 and produces an enabling signal that energizes light source 34, thereby projecting line 42 onto surface 38. In this way the user has a direct visual indication of edge 18's location behind wall 12 without having to view indicators mounted in the detector unit housing, as discussed above. As can be seen, line 42 represents an approximately perpendicular graphical projection of edge 18 onto surface 38, indicated by dashed lines 44.

FIG. 2B is similar to FIG. 2A, but illustrates stud 14's center position 20 being shown on surface 38 by line 42. As shown, sensor element array 28 is positioned above and mid-way between stud 14's edges 18 and 22. A detecting circuit (FIG. 3) detects center position 20 and produces an enabling signal that energizes light source 34, thereby projecting line 42 onto surface 38. In FIG. 2B, line 42 represents an approximately perpendicular graphical projection of center position 20 onto surface 38, indicated by dashed lines 44.

Figure 3:
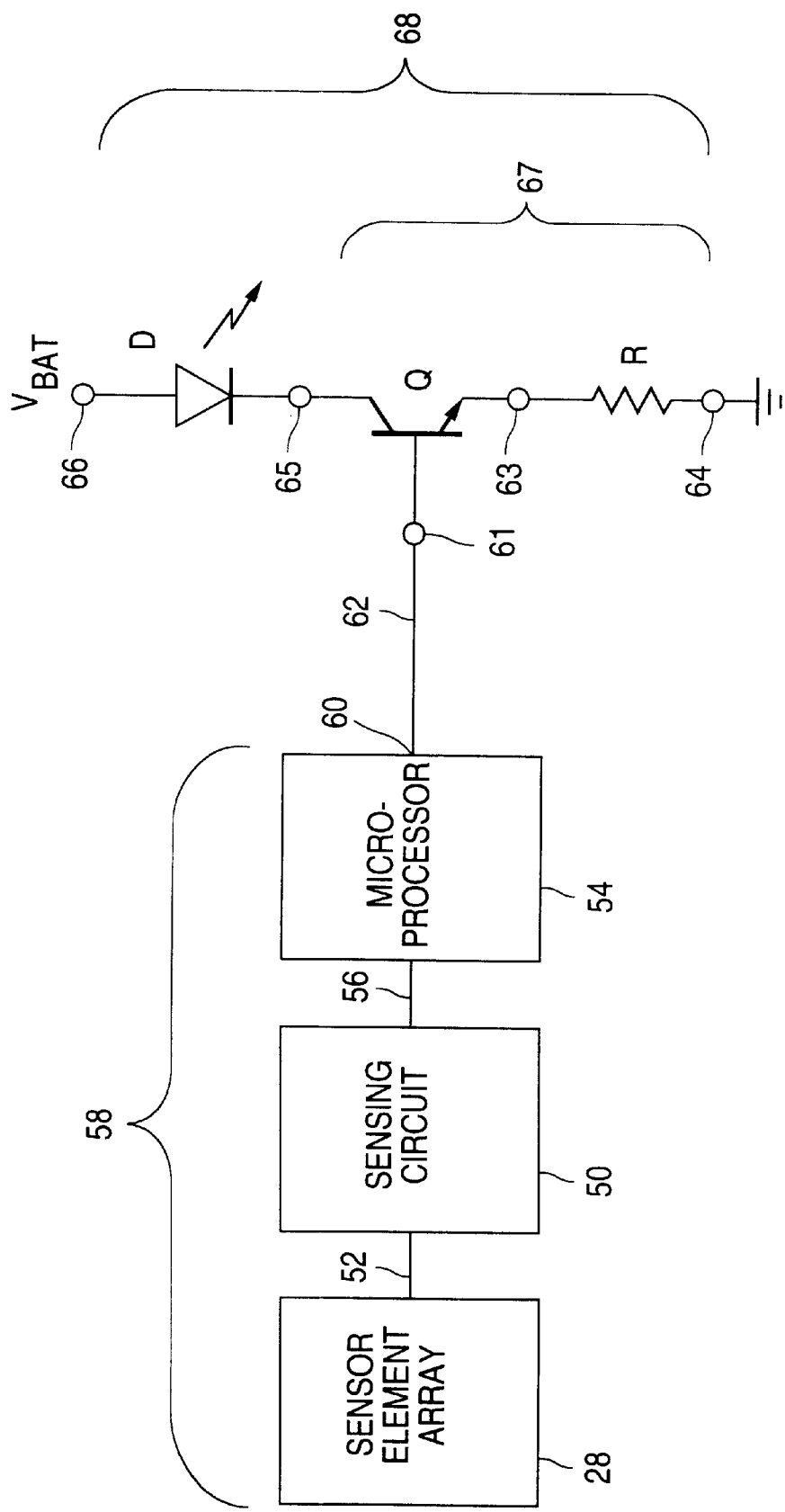
FIG. 3 is a schematic diagram of an embodiment of the invention.

FIG. 3 is a schematic diagram of an embodiment of the invention. Sensor element array 28 includes at least one sensor element and is coupled to sensing circuit 50 using bus 52. Sensing circuit 50 is shown coupled to microprocessor 54 using bus 56. In one embodiment, microprocessor 54 is a conventional 8-bit microprocessor such as a Microchip PIC 16C58. Other embodiments may use other microprocessors. Array 28, circuit 50, and microprocessor 54 combined are detecting circuit 58. It is important to recognize that embodiments of the present invention may be combined with a variety of detecting circuit 58 configurations. Embodiments of the invention only require that a signal or other indication of a sensed object be provided so as to activate a light source or to alert the user to activate the light source. Many known circuits provide such a signal or indication.

As shown, microprocessor 54's output port 60 is connected to the base terminal 61 of transistor Q using line 62. In one embodiment transistor Q is a conventional bipolar 2N3904 transistor. In other embodiments transistor Q may be a another type of semiconductor device in which current flow between two terminals is controlled by a signal, e.g., voltage or current change, received at a third terminal. For example, transistor Q may be a field effect transistor.

As shown, transistor Q's emitter terminal 63 is connected through resistor R to terminal 64, at which a reference potential (e.g., ground potential) exists. In one embodiment resistor R is a 220K resistor. Other embodiments may use different values for resistor R.

Transistor Q's collector terminal 65 is connected through light-emitting diode D to another terminal 66, at which a voltage source (not shown) provides potential $V_{BAT}$. In one embodiment the voltage source is a battery and $V_{BAT}$ is approximately +9V. And, in one embodiment diode D is a Nichia Model No. NSPB510S light-emitting diode. In other embodiments, components similar or equivalent to transistor Q, resistor R, and diode D may be used.

As shown, transistor Q and resistor R together are activating circuit 67 having terminals 61, 64, and 65. When an enabling signal, e.g., +5V, exists at terminal 61, current to activate diode D flows between terminals 64 and 65. Activating circuit 67 and diode D in combination constitute display circuit 68 coupled to terminals 61, 64, and 66. Embodiments of the invention may use other activating circuits and display circuits. As for detecting circuit 58 discussed above, it is important to realize that many different configurations of activating circuit 67 and display circuit 68 may be used in embodiments of the invention. Activating circuits need not be completely automatic. For example, in one embodiment discussed in detail below, when a user hears an audio tone indicating the detector unit has detected an object, the user presses a button to energize a display circuit so as to project the light.

As depicted in FIG. 3, when detecting circuit 58 senses a characteristic of a hidden object, such as an edge, in response microprocessor 54 outputs through port 60 a signal on line 62. The signal represents a logic state change from, for example, logic low (e.g., zero volts) to logic high (e.g., +5 volts). The logic high state on line 62 allows current to flow through transistor Q, thereby causing diode D to emit light. When detector circuit 58 no longer senses the hidden object's characteristic, microprocessor 54 changes the signal output through port 60 to represent, for example, a logic low. The logic low state prevents sufficient current from flowing in transistor Q, and diode D no longer emits light.

Figure 4:
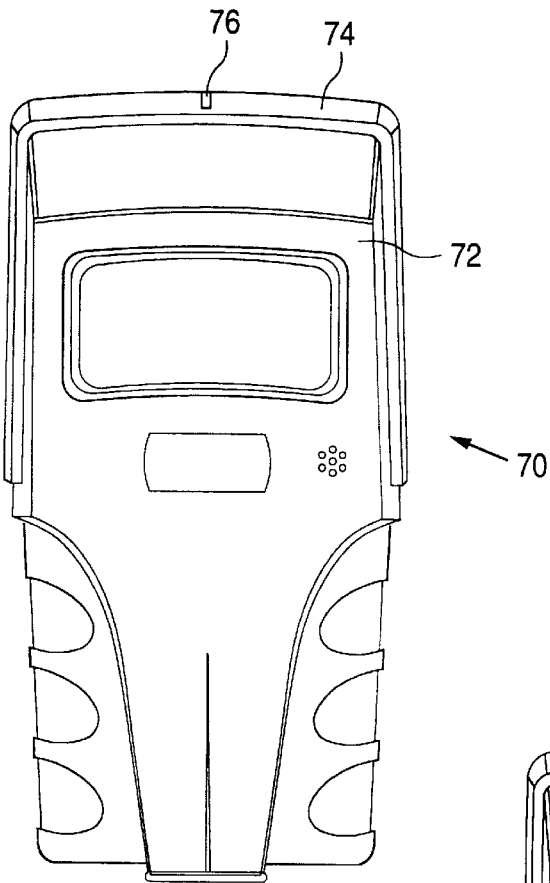
FIG. 4 is a plan view showing an embodiment of the invention.

FIG. 4 is a plan view showing an embodiment of the invention. As depicted, detector unit 70 includes detector housing 72. Housing 72 has opaque front surface 74, in which aperture 76 is defined. A light source (not shown) contained within housing 72, such as light source 34 (FIG. 2A), diode D (FIG. 3), or diode 194 (FIG. 22), radiates light through aperture 76 onto a surface (e.g., a wall) behind which an object is hidden from view.

FIGS. 5A–5C illustrate an application of a detecting unit in which an embodiment of the invention is coupled to a detector circuit that senses a framing stud. FIG. 5A shows the front portion of detector unit 70a against wall 12. Stud 14 is shown hidden behind wall 12. Circuits within unit 70a are designed to sense, in this instance, framing studs. As shown in FIG. 5A, unit 70a does not detect stud 14. Therefore, no light is projected through aperture 76. FIG. 5B shows detector unit 70a moved to the right, detecting stud 14, and thus projecting line 42 on wall 12. FIG. 5C shows detector unit 70a moved farther to the right, continuing to detect stud 14, and continuing to project line 42 on wall 12. In this embodiment, when unit 70a moves even farther to the right past edge 22, line 42 is no longer projected onto wall 12.

FIGS. 6A–6C illustrate an application of a detecting unit in which an embodiment of the invention is coupled with a detecting circuit that detects framing stud edges. Circuits within unit 70b are designed to sense, in this instance, framing stud edges. In FIG. 6A detector unit 70b does not detect stud 14's edge 18, and no light is projected through aperture 76. FIG. 6B shows detector unit 70b moved to the right, detecting edge 18, and thus projecting line 42 on wall 12. FIG. 6C shows detector unit 70b moved farther to the right, no longer detecting edge 18, and therefore no longer projecting line 42 onto wall 12. Detector unit 70b may also project line 42 onto wall 12 as it detects edge 22, or as it detects a position between edges 18 and 22. For example, referring to FIGS. 6A–6C, as one embodiment of detector unit 70b is moved to the right, line 42 is first projected over edge 18, line 42 is turned off past edge 18, and line 42 is again projected over a position mid-way between edges 18 and 22.

Figure 7:
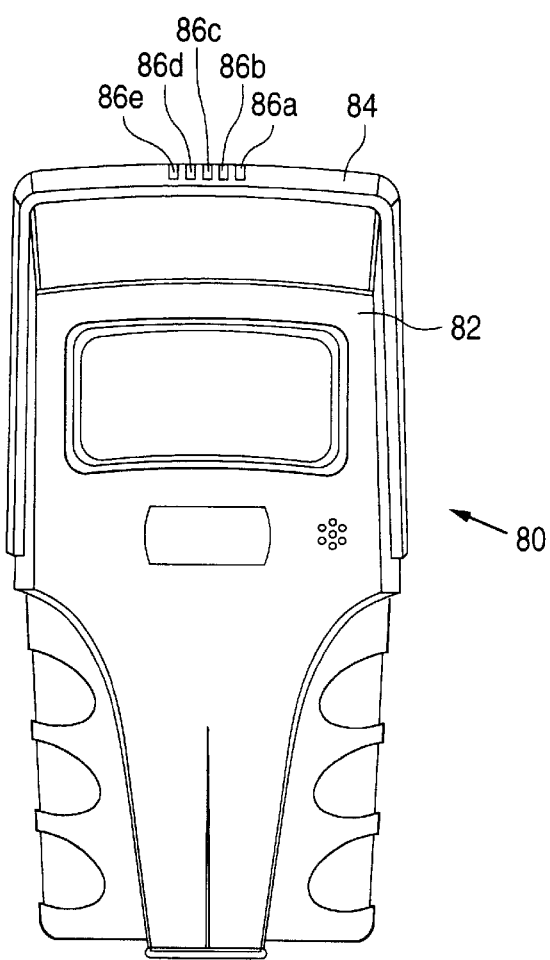
FIG. 7 is a plan view showing a second embodiment of the invention.

FIG. 7 is a plan view showing another embodiment of the invention. As depicted, detector unit 80 has housing 82. Housing 82 includes front surface 84, and five apertures 86a–86e are defined in front surface 84. Other embodiments may have more or fewer than five apertures. In accordance with the invention, light may be projected through one or more of apertures 86a–86e onto a surface concealing a hidden object. The condition upon which light is projected through each aperture is determined by the particular detector circuit included in detector unit 80. Examples of multiple aperture projection are described below.

In one embodiment, a unique conventional light source within housing 82 is paired with each aperture so that a unique line is projected onto a surface through each of apertures 86a–86e. In other embodiments a single conventional light source is used. To control light traveling from a single source to two or more apertures, a conventional shutter is placed between the light source and each aperture. In one embodiment, for example, light from a single light source, such as a conventional LED, is routed using conventional light pipes, such as optical fibers, to two or more apertures. Light to each aperture is conventionally modulated on or off by a shutter such as a conventional LCD element or conventional electro-mechanical shutter placed in the path between the light source and the aperture. When an enabling signal opens the shutter, light passes through the aperture and is incident on the surface concealing the sensed object. In embodiments using one or more shutters, the conventional circuit controlling shutter operation is considered the activating circuit.

FIGS. 8A–8C illustrate an application of a detecting unit in which the embodiment of the housing and apertures shown in FIG. 7 is combined with a detecting circuit that detects a framing stud edge. FIG. 8A shows apertures 86a–86e defined in front surface 84. Circuits within detector unit 80a are, in this instance, designed to detect framing stud edges. In FIG. 8A, detector unit 80a does not detect framing stud 14's edge 18, and no light is projected though apertures 80a–80e. FIG. 8B shows detector unit 80a moved to the right and starting to detect edge 18. As shown, line 42a is projected through aperture 86a onto wall 12, thereby representing the location of edge 18 underneath wall 12. FIG. 8C shows detector unit 80a moved farther to the right and still detecting edge 18. As shown, however, unit 80a is displaced relative to edge 18 and therefore line 42a is no longer projected onto wall 12. Instead, line 42c is projected through aperture 86c onto wall 12. It can be seen that as detector unit 80a moves over edge 18, a more continuous projection of edge 18's location occurs as lines are projected in turn through apertures 86a–86e. In some embodiments, edge 22's location, or a location between edges 18 and 22, is similarly displayed as the detector unit moves over and detects these characteristics.

FIGS. 9A–9C illustrate an application of a detecting unit in which the embodiment of the housing and apertures shown in FIG. 7 is combined with a detecting circuit that detects a framing stud. Circuits within detecting unit 80b detect, in this instance, framing studs. In FIG. 9A, detector 80b does not detect framing stud 14, and no light is projected though apertures 86a–86e. FIG. 9B shows detector unit 80b moved to the right and starting to detect stud 14. As shown, line 42a is projected through aperture 86a onto wall 12, thereby representing the location of a sensed portion of stud 14 underneath wall 12. FIG. 9C shows detector unit 80b moved farther right, continuing to detect stud 14. As shown, lines 42a, 42b, and 42c are each projected onto wall 12 through apertures 86a, 86b, and 86c, respectively, thereby representing stud 14's location under wall 12.

An advantage to a display having more than one projected line is that it may assist a user to more quickly identify the orientation of a lengthy hidden object. If, for example, all lines are projected nearly simultaneously as the user moves the sensor, the simultaneous projections indicate that the lines point in a direction approximately perpendicular to the hidden object's long axis. If, however, the individually projected lines illuminate in sequence at a rate approximately corresponding to the sensor's speed, it indicates that the lines point in a direction approximately parallel to the hidden object's long axis.

Figure 10:
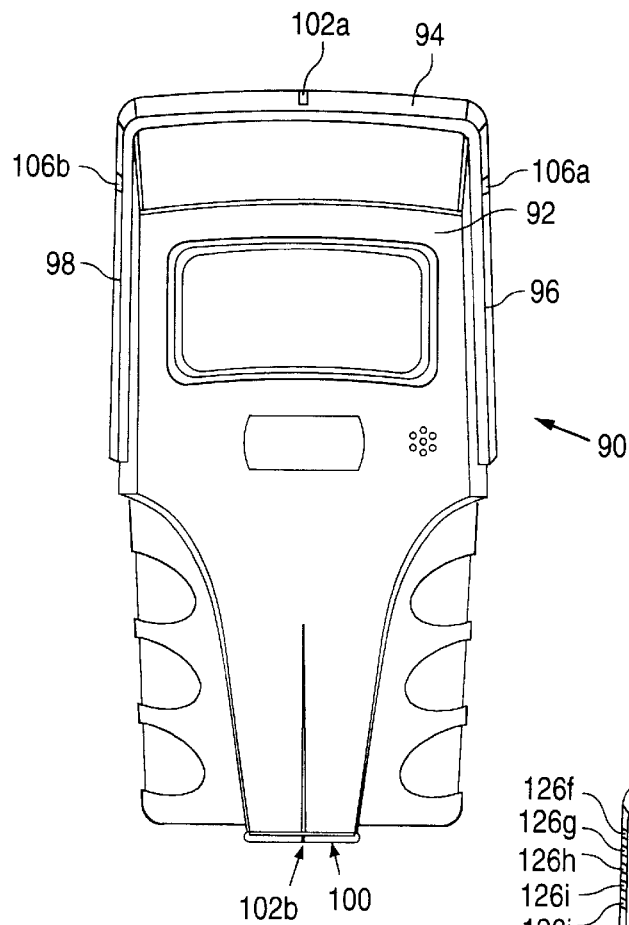
FIG. 10 is a plan view showing a third embodiment of the invention.
Figure 11:
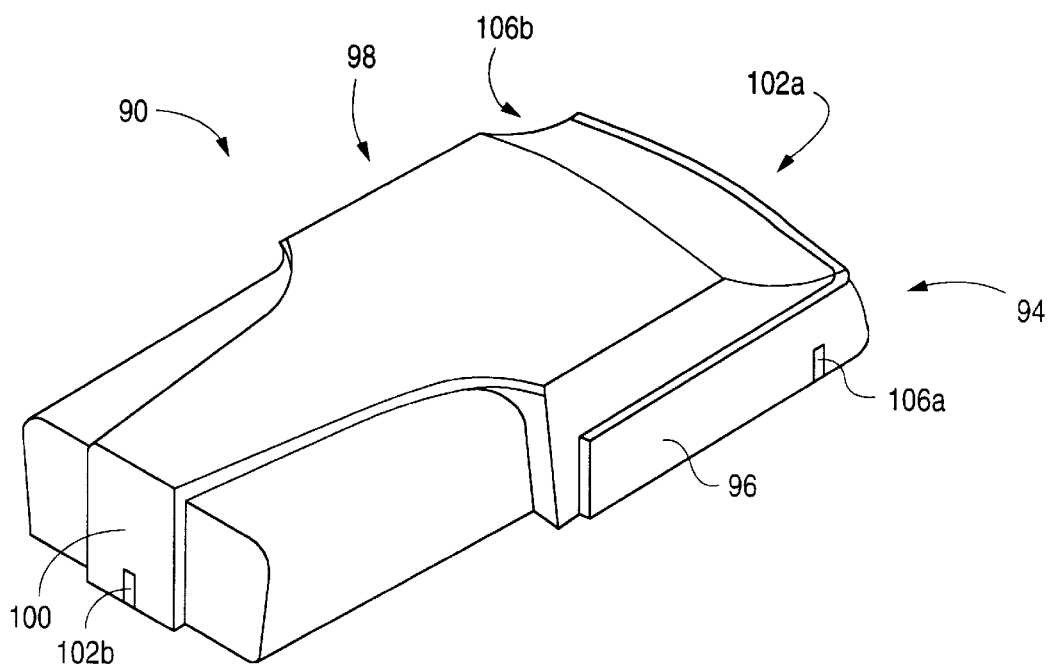
FIG. 11 is a perspective view of the embodiment shown in FIG. 10.

FIG. 10 is a plan view showing another embodiment of the invention. As shown, detector unit 90 has housing 92. Housing 92 includes front surface 94, right side surface 96, left side surface 98, and rear surface 100. Aperture 102a is defined in front surface 94, and aperture 102b is defined in rear surface 100. FIG. 11 is a perspective view more clearly showing aperture 102b defined in rear surface 100. Referring again to FIG. 10, apertures 102a and 102b are aligned with each other so that light passes outward through aperture 102b in an opposite direction from light passing outward through aperture 102a. Thus light beams passing through apertures 102a and 102b are aligned with unit 90's longitudinal axis. The light passing through apertures 102a and 102b may be from a single source or separate sources, as described above.

Figure 12:
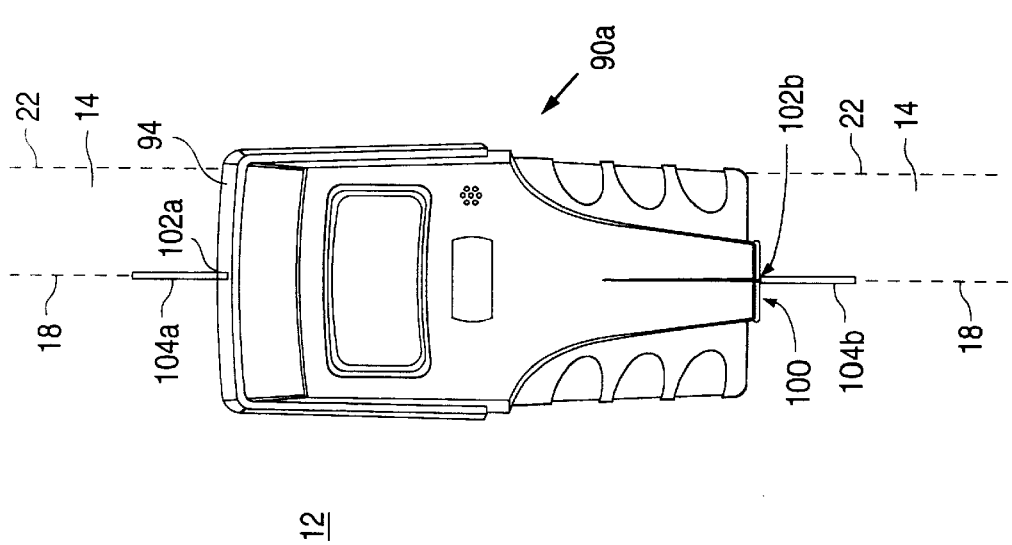
FIG. 12 is a plan view showing an application of an embodiment of the invention displaying the location of the edge of a framing stud.

FIG. 12 illustrates an application of a detector unit 90a having apertures 102a and 102b defined in front surface 94 and rear surface 100, respectively. As shown, circuits within unit 90a detect, in this instance, the edge of a framing stud. As detector unit 90a detects edge 18 of framing stud 14, light is projected through both apertures 102a and 102b. Light passing through aperture 102a is incident on wall 12 as line 104a; light passing through aperture 102b is incident as line 104b. As can be seen, lines 104a and 104b are each aligned with unit 90a's longitudinal axis. Other embodiments of unit 90a may detect, for example, the center position or the mass of stud 14.

Referring again to FIG. 10, aperture 106a is defined in right side surface 96, and aperture 106b is defined in left side surface 98. FIG. 11 shows aperture 106a more clearly defined in surface 96. Aperture 106b (hidden from view) is similarly defined in surface 98 (hidden from view). As FIG. 10 shows, apertures 106a and 106b are aligned with each other so that light passes outward through aperture 106b in an opposite direction from light passing outward through aperture 106a. Thus light beams passing through apertures 106a and 106b are aligned with unit 90's lateral axis. The light passing through apertures 102a and 102b may be from a single light source or separate sources, as described above.

Figure 13:
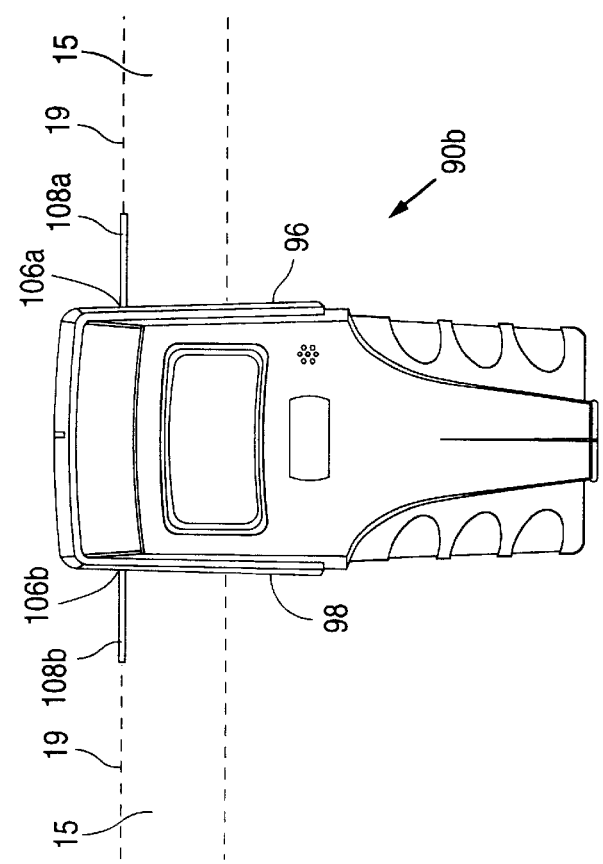
FIG. 13 is a plan view showing an application of an embodiment of the invention displaying the location of the edge of a framing stud.

FIG. 13 illustrates an application of a detector unit 90b having apertures 106a and 106b defined in right side surface 96 and left side surface 98, respectively. As shown, circuits within unit 90b detect, in this instance, the edge of a framing stud. As detector unit 90b detects edge 19 of framing stud 15, light is projected through both apertures 106a and 106b. Light passing through aperture 106a is incident on wall 12 as line 108a; light passing through aperture 106b is incident as line 108b. As can be seen, lines 108a and 108b are each aligned with unit 90b's lateral axis. Other embodiments of unit 90b may detect, for example, the center position or mass of stud 15.

FIG. 14 illustrates an application of a detector unit 90c. Vertical stud 14 and horizontal stud 15 intersect behind wall 12. As shown, detector unit 90c, in this instance, detects both edge 18 of stud 14, and edge 19 of stud 15. Thus, when both edges 18 and 19 are sensed, light is projected through apertures 102a, 102b, 106a, and 106b to indicate the position of both edges 18 and 19 behind wall 12. Some embodiments, however, may omit either apertures 102a and 102b, or apertures 106a and 106b. As shown, lines 104a and 104b are projected onto wall 12 along unit 90c's longitudinal axis, and lines 108a and 108b are projected onto wall 12 along unit 90c's lateral axis, perpendicular to the longitudinal axis. In some embodiments, light is projected only in opposite directions along the longitudinal axis of the detector unit, or only on opposite directions along the lateral axis of the detector unit. And in some embodiments, the user selects the lateral, longitudinal, or combined lateral and longitudinal display to be presented using, for example, a switch.

Figure 15:
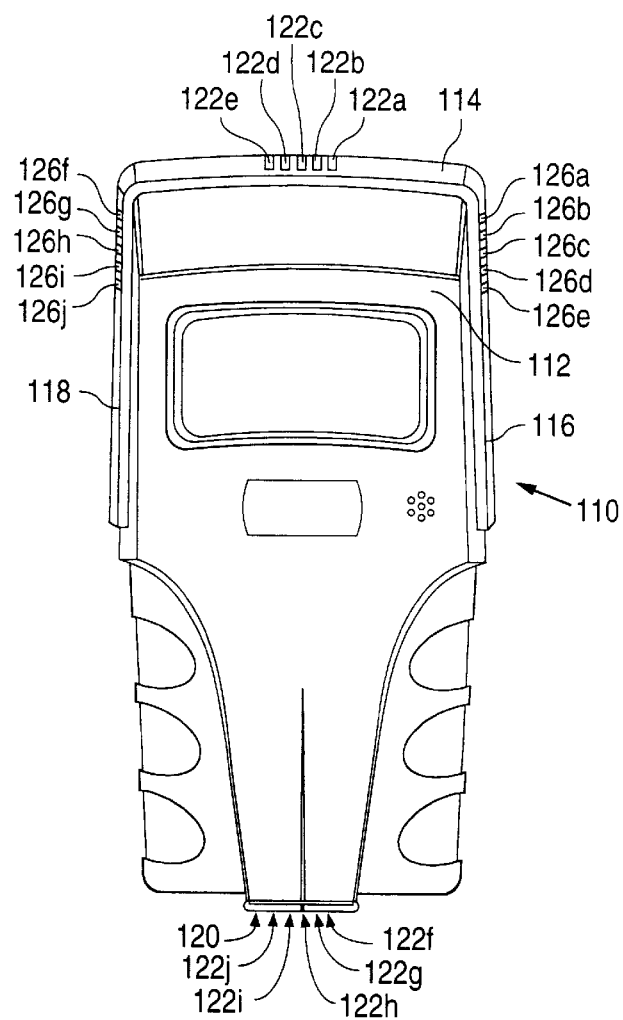
FIG. 15 is a plan view showing a fourth embodiment of the invention.
Figure 16:
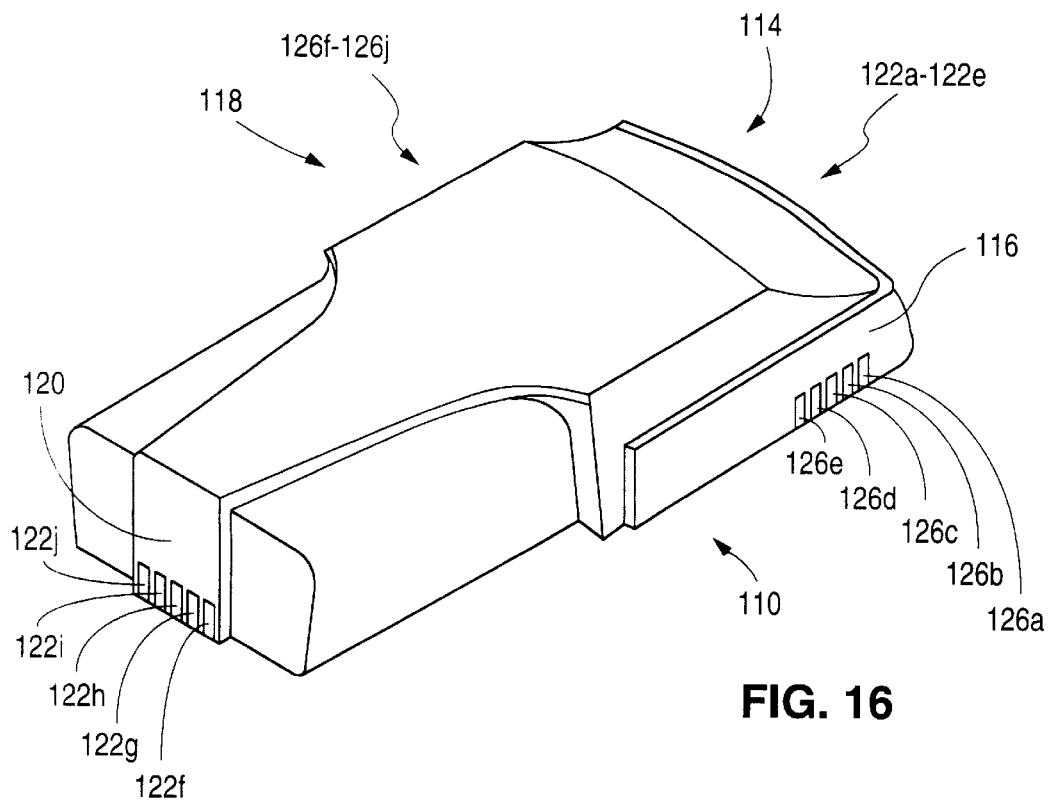
FIG. 16 is a perspective view of the embodiment shown in FIG. 15.

FIG. 15 is a plan view showing detector unit 110 having housing 112. Housing 112 includes front surface 114, right side surface 116, left side surface 118, and rear surface 120. Apertures 122a, 122b, 122c, 122d, and 122e are defined in front surface 114. Similarly, apertures 122f, 122g, 122h, 122i, and 122j are defined in rear surface 120. Thus light is projected in opposite directions along detector unit 110's longitudinal axis through one or more pairs of opposite apertures, for example apertures 122a and 122f. FIG. 16 is a perspective view more clearly showing apertures 122f–122j defined in rear surface 120. Other embodiments may have a different number of apertures in rear surface 120 and in front surface 114 (hidden from view). Referring to FIG. 15, light passing through apertures 122a–122j may be from a single source, or from multiple sources, as described above.

FIG. 17 illustrates an application of a detector unit 110a having apertures 122a–122e defined in front surface 114, and apertures 122f–122j defined in rear surface 120. As shown, circuits within unit 110a detect, in this instance, a framing stud. As detector unit 110a is moved to the right and partially detects framing stud 14, light is projected through opposite aperture pairs 122a and 122f, 122b and 122g, and 122c and 122h. As shown, the projected light is incident on wall 12 as paired lines 128a and 128f, 128b and 128g, and 128c and 128h, respectively. Other embodiments may project multiple opposite light patterns in manners similar to the light patterns projected in a single direction as discussed above in relation to FIGS. 7, 8A–8C, and FIGS. 9A–9C.

Referring again to FIG. 15, apertures 126a, 126b, 126c, 126d, and 126e are shown defined in right side surface 116, and apertures 126f, 126g, 126h, 126i, and 126j are shown defined in left side surface 118. In a manner similar to opposite patterns projected along the longitudinal axis of detector 110 through apertures 122a–122j, opposite patterns are projected along detector 110's lateral axis through apertures 126a–126j. FIG. 16 more clearly shows apertures 126a–126e defined in surface 116. Apertures 126f–126j (hidden from view) are similarly defined in surface 118 (hidden from view). Other embodiments may have a different number of apertures defined in surfaces 116 and 118. Referring to FIG. 15, light passing through apertures 126a–126j may be generated by a single source or several sources.

FIG. 18 illustrates an application of detector unit 110b having apertures 126a–126e defined in right side surface 116, and apertures 126f–126j defined in left side surface 118. As shown, circuits within unit 110b detect, in this instance, horizontal framing stud 15. As detector unit 110b is moved downward along wall 12 and partially detects stud 15, light is projected through opposite aperture pairs 126e and 126j, 126d and 126i, and 126c and 126h. Light projected through the apertures is incident on wall 12 as paired lines 130e and 130j, 130d and 130i, and 130c and 130h, respectively.

FIG. 19 illustrates an application of a detector unit 110c. Vertical stud 14 and horizontal stud 15 intersect behind wall 12. As shown, detector unit 110c in this instance, detects both stud 14 and stud 15. Thus, light is projected through apertures 122a–122c, 122f–122h, 126c–126e, and 126h–126j. Consequently, lines 128a–128c, 128f–128h, 130c–130e, and 130h–130j indicate the position of both studs 14 and 15 behind wall 12. Embodiments of the invention exist in which light is projected only in opposite directions along the longitudinal axis of the detector unit, or only on opposite directions along the lateral axis of the detector unit. And in some embodiments the user selects longitudinal, lateral, or combined longitudinal and lateral projections using, for example, a switch.

Figure 20:
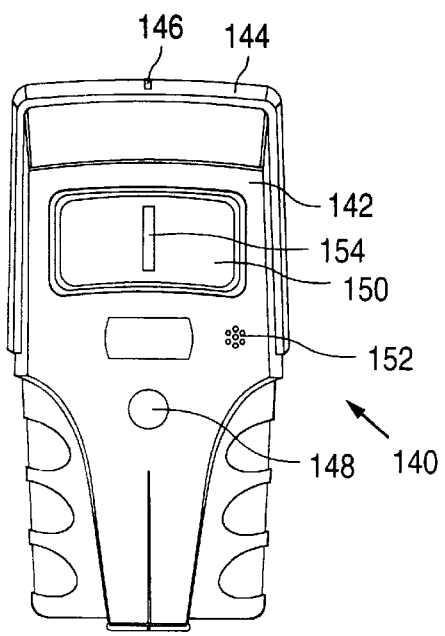
FIG. 20 is a plan view of a fifth embodiment of the invention.

FIG. 20 is a plan view showing another embodiment of the invention. As shown, detector unit 140 has housing 142 that includes front surface 144. Aperture 146 is defined in surface 144. Also shown is push-button type switch 148 in housing 142 and display 150. As depicted, display 150 is a liquid crystal type display, but other embodiments may use other displays such as LEDs. Holes 152 are defined in housing 142, and beneath holes 152 is a conventional audio speaker (not shown).

As mentioned above, displays in accordance with this invention may be activated manually rather than automatically. Thus when the predetermined characteristic of a hidden object is sensed, the enabling signal produced by the detecting circuit is used to alert the user who, at his or her option, activates the display. For example, the enabling signal from the detecting circuit may be used to generate an audio tone using a conventional tone generating circuit driving the speaker mounted behind holes 152. Alternatively, the enabling signal may be used to activate a conventional LCD control circuit to produce a visible symbol, such as LCD element 154 on display 150. Other embodiments may produce other outputs perceivable by the user.

Figure 21:
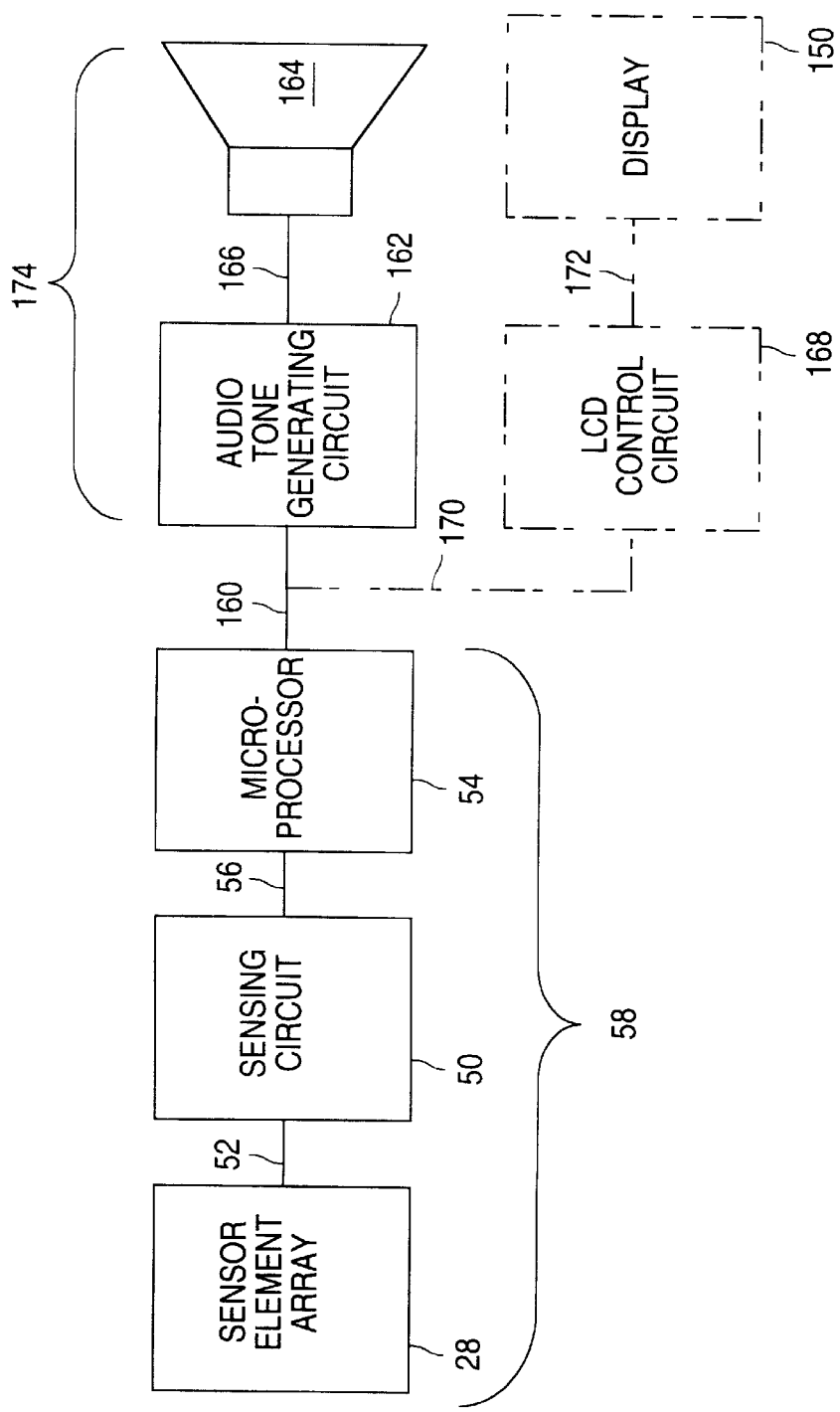
FIG. 21 is a block diagram showing an alerting circuit coupled with a detecting circuit.

FIG. 21 is a block diagram showing an alerting circuit 174 coupled with a detecting circuit 58. The elements shown in detecting circuit 58 are described above in relation to FIG. 3. Bus 160 couples microprocessor 54 and conventional audio tone generating circuit 162. Conventional audio speaker 164 is coupled via line 166 to tone generating circuit 162. Many conventional audio tone generating circuits are known that, while receiving an enabling signal such as a signal generated by detecting circuit 58, will produce an audio tone using speaker 164. Alternatively, conventional LCD control circuit 168 is coupled to microprocessor 54 via bus 170. Control circuit 168 conventionally drives via line 172 elements in a conventional LCD, such as display 150 (FIG. 20). Many conventional LCD control circuits are known that will produce a visible display upon receiving an enabling signal from a detecting circuit, such as a signal generated by detecting circuit 58. Tone generating circuit 162 together with speaker 164, and control circuit 168 together with display 150, are each examples of an alerting circuit 174. In other embodiments, microprocessor 54 may be used to output an enabling signal to activate other conventional alerting circuits that generate user-perceivable indications of a sensed object.

Figure 22:
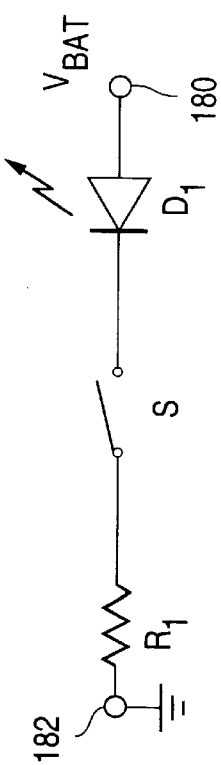
FIG. 22 is a schematic diagram showing a manually operated display circuit.

FIG. 22 is a schematic diagram of a user-operated display circuit. LED $D_1$, for example a Nichia Model No. NSPB510S, receives electric potential $V_{BAT}$, for example +9V, at terminal 180 from a voltage source (not shown) such as a conventional 9 volt battery. The other terminal of diode $D_1$ is connected to one terminal of conventional manual switch S. In one embodiment switch S is a conventional push-button type switch. Other conventional switches, such as a slide type switch, may be used. Resistor $R_1$ is a 220K resistor connected between switch S and terminal 182 at which a reference potential (e.g., ground potential) exists. When the user closes switch S, diode $D_1$ generates light that passes through apertures in a detector unit and is incident on a surface concealing a hidden object, as described above. Other suitable conventional manually operated display circuits may be used.

Figure 23:
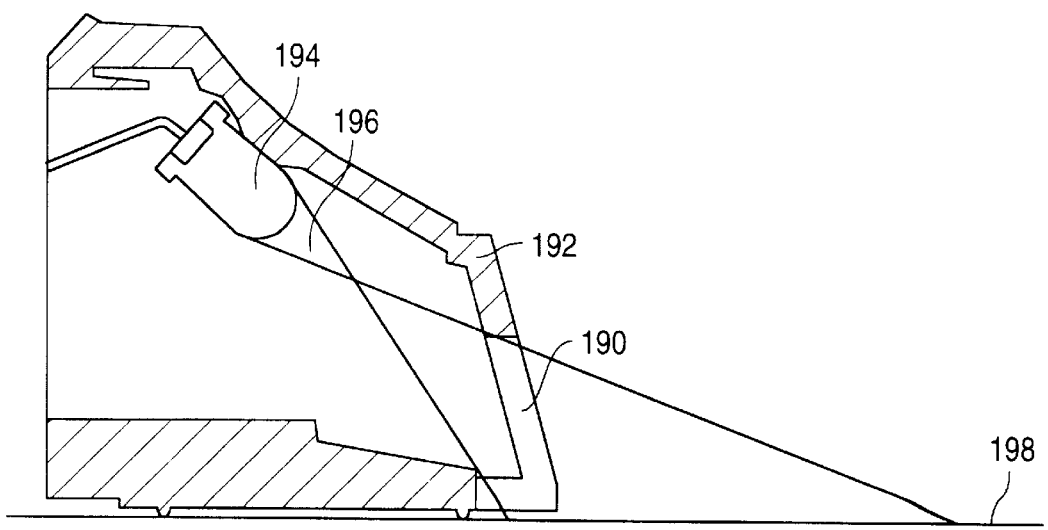
FIG. 23 is a cross-sectional view of an embodiment of a light source and aperture pair in accordance with the invention.

FIG. 23 is a cross-sectional view showing an embodiment of a light source and aperture combination in accordance with the invention. Aperture 190 is placed in sensor housing 192. Light source 194, an LED, is mounted within housing 192 and is connected to an activating circuit, such as activating circuit 67 (FIG. 3). When the activating circuit energizes light source 194, light 196 radiates through aperture 190 and projects a pattern corresponding to aperture 190's shape onto surface 198. In embodiments configured to project multiple lines, such as that shown in FIG. 7, a unique light source and aperture combination exists for each individual pattern to be projected.

The above description has concentrated on specific embodiments and several specific illustrative applications, namely identifying the location of a framing stud behind a relatively smooth surfaced wall. However the invention is not limited to these specific embodiments or applications. For example, detector unit displays in accordance with the invention may show locations of other objects hidden from view such as pipes, conduits, electrical wiring, or gas lines. Hidden objects may be behind a surface such as a wall, floor, or ceiling, or may be within a larger object such as formed concrete or earth. The surface may be, for example, rough brick or grass, and may be curved. Detector unit displays in accordance with the present invention may be combined with many detector unit types designed for both indoor and outdoor use. Thus persons skilled in the art will appreciate that many embodiments of the invention exist other than those specifically described above. The scope of the present invention is limited only by the following claims.

I claim:

1. A detector display comprising:
    a housing having an aperture;
    a detecting circuit having a sensor element, wherein if the sensor element is over a surface and senses a characteristic of an object hidden behind the surface, then the detecting circuit generates an enabling signal corresponding to the sensed characteristic; and
    an activating circuit coupled to a light source adjacent the aperture and to receive the enabling signal, the activating circuit activating the light source if receiving the enabling signal;
    wherein light from the light source passes through the aperture and is incident on the surface, the incident light indicating on the surface a position of the object behind the surface.

2. The display of claim 1 wherein light incident on the surface defines a pattern indicating an approximately perpendicular projection of the characteristic onto the surface.

3. The display of claim 1 wherein the light source is a light-emitting diode.

4. The display of claim 1 wherein the characteristic is an edge of the object.

5. The display of claim 1 wherein the characteristic is a position between two edges of the object.

6. The display of claim 1 wherein the characteristic is a position approximately equidistant between two edges of the object.

7. The display of claim 1 wherein the characteristic is either an edge of the object or a position approximately equidistant between two edges of the object.

8. The display of claim 1 wherein the characteristic is a characteristic of the mass of the object.

9. The display of claim 1 wherein the characteristic is a characteristic of an electric field emitted by the object.

10. The display of claim 1 wherein the characteristic is a characteristic of a magnetic field emitted by the object.

11. The display of claim 1 wherein the characteristic is a characteristic of a magnetic field affected by the object.

12. The display of claim 1 wherein light from the light source passing through the aperture is incident on the surface as a line.

13. A detector display comprising:
   a housing having a first aperture and a second aperture;
   a detecting circuit having a sensor element, wherein if the sensor element is over a surface and senses a characteristic of an object hidden behind the surface, then the detecting circuit generates a first enabling signal and a second enabling signal, the first and second enabling signals corresponding to the sensed characteristic;
   a first activating circuit coupled to a first light source adjacent the first aperture and to receive the first enabling signal, the first activating circuit activating the first light source if receiving the first enabling signal; and
   a second activating circuit coupled to a second light source adjacent the second aperture and to receive the second enabling signal, the second activating circuit activating the second light source if receiving the second enabling signal;
   wherein light from the first light source passes through the first aperture and is incident on the surface and light from the second light source passes through the second aperture and is incident on the surface, the incident light from the first and second light sources indicating on the surface a position of the object behind the surface.

14. The display of claim 13 wherein the characteristic is an edge of the object.

15. The display of claim 13 wherein the characteristic is a position between two edges of the object.

16. The display of claim 13 wherein the characteristic is a position approximately equidistant between two edges of the object.

17. The display of claim 13 wherein the characteristic is either an edge of the first object or a position approximately equidistant between two edges of the object.

18. The display of claim 13 wherein the characteristic is a characteristic of the mass of the object.

19. The display of claim 13 wherein the characteristic is a characteristic of an electric field emitted by the object.

20. The display of claim 13 wherein the characteristic is a characteristic of a magnetic field emitted by the object.

21. The display of claim 13 wherein the characteristic is a characteristic of a magnetic field affected by the object.

22. The display of claim 13 wherein light passes through the first aperture in a first direction, and light passes through the second aperture in a second direction.

23. The display of claim 22 wherein the second direction is opposite the first direction.

24. The display of claim 22 wherein the second direction is approximately perpendicular to the first direction.

25. The display of claim 22 wherein the second direction is the same as the first direction.

26. A detector display comprising:
   a housing having a first aperture and a second aperture;
   a detecting circuit having sensor elements, wherein if the sensor elements are over a surface and sense a first characteristic of a first object hidden behind the surface and sensing a second characteristic of a second object hidden behind the surface, then the detecting circuit generates a first enabling signal corresponding to the first sensed characteristic and a second enabling signal corresponding to the second sensed characteristic;
   a first activating circuit coupled to a first light source adjacent the first aperture and to receive the first enabling signal, the first activating circuit activating the first light source if receiving the first enabling signal; and
   a second activating circuit coupled to a second light source adjacent the second aperture and to receive the second enabling signal, the second activating circuit activating the second light source if receiving the second enabling signal;
   wherein light from the first light source passes through the first aperture and is incident on the surface and light from the second light source passes through the second aperture and is incident on the surface, the incident light from the first light source indicating on the surface a position of the first object behind the surface and the incident light from the second light source indicating on the surface a position of the second object behind the surface.

27. The display of claim 26 wherein:
   the housing has a third and a fourth aperture;
   the detecting circuit, if the sensor elements are over the surface and sense a third characteristic of the first object and a fourth characteristic of the second object, generates a third enabling signal corresponding to the third characteristic and a second enabling signal corresponding to the second sensed characteristic;
   a third activating circuit coupled to a third light source adjacent the third aperture and to receive the third enabling signal, the third activating circuit activating the third light source if receiving the third enabling signal; and
   a fourth activating circuit coupled to a fourth light source adjacent the fourth aperture and to receive the fourth enabling signal, the fourth activating circuit activating the fourth light source if receiving the fourth enabling signal;
   wherein light from the third light source passes through the third aperture and is incident on the surface an light from the fourth light source passes through the second aperture and is incident on the surface, the incident light form the third light source indicating on the surface a position of the first object behind the surface and the incident light from the second light source indicating on the surface a position of the second object behind the surface.

28. The display of claim 27 wherein light passing through the first and the second apertures travels in a first direction, and light passing through the third and the fourth apertures travels in a second direction.

29. The display of claim 28 wherein the second direction is opposite the first direction.

30. The display of claim 28 wherein the second direction is approximately parallel to the first direction.

31. A display process comprising the acts of:
providing a housing having a first aperture;
providing an activating circuit coupled to activate a light source adjacent the first aperture;
providing a detecting circuit having a sensor element;
positioning the sensor element over a surface;
providing an enabling signal to the activating circuit if the detecting circuit senses a characteristic of an object hidden behind the surface; and
using the activating circuit to activate the light source subsequent to receiving the enabling signal;
wherein light from the light source passes through the first aperture and is incident on the surface, the incident light indicating on the surface a position of the object behind the surface.

32. The process of claim 31 further comprising:
providing a second aperture in the housing;
providing a second activating circuit coupled to activate a second light source adjacent the aperture;
providing a second enabling signal to the activating circuit if the detecting circuit senses a second characteristic of the object; and
using the second activating circuit to activate the second light source subsequent to receiving the enabling signal;
wherein light from the second light source passes through the second light source and is incident on the surface.

33. The process of claim 31 wherein the characteristic is an edge of the object.

34. The process of claim 31 wherein the characteristic is a position between two edges of the object.

35. The process of claim 31 wherein the characteristic is a position approximately equidistant between two edges of the object.

36. The process of claim 31 wherein the characteristic is either an edge of the object or a position approximately equidistant between two edges of the object.

37. The process of claim 31 wherein the characteristic is a characteristic of the mass of the object.

38. The process of claim 31 wherein the characteristic is a characteristic of an electric field emitted by the object.

39. The process of claim 31 wherein the characteristic is a characteristic of a magnetic field emitted by the object.

40. The process of claim 31 wherein the characteristic is a characteristic of a magnetic field affected by the object.

41. The process of claim 32 wherein the light passing through the first aperture and the light passing through the second aperture are directed in the same direction.

42. The process of claim 32 wherein the light passing through the first aperture and the light passing through the second aperture are directed in opposite directions.

43. The process of claim 32 wherein the light passing through the first aperture and the light passing through the second aperture are directed in approximately perpendicular directions.

44. A handheld detector display comprising:
a housing having an aperture;
a detecting circuit having a sensor element, wherein if the sensor element is over a surface and senses a characteristic of an object hidden behind the surface, then the detecting circuit generates an enabling signal corresponding to the sensed characteristic;
a display circuit having a first terminal at which a first electrical potential is received, a second terminal at which a second electrical potential is received, and a third terminal at which the enabling signal is received;
wherein when the enabling signal is present at the third terminal, light generated by the display circuit passes through the aperture and is incident on the surface, the incident light indicating on the surface a position of the object behind the surface.

45. The display of claim 44 wherein the display circuit comprises a semiconductor device.

46. The display of claim 44 wherein the semiconductor device is a bipolar transistor.

47. The display of claim 44 wherein the display circuit comprises a light-emitting diode coupled between the first terminal and the collector of a bipolar transistor, and a resistor coupled between the second terminal and the emitter of the transistor.

48. The display of claim 44 wherein the third terminal is coupled to a microprocessor.

49. A portable hidden object detector unit comprising:
a housing having an aperture;
a detecting circuit having a sensor element, wherein if the sensor element is over a surface and senses a characteristic of an object hidden behind the surface, then the detecting circuit generates an enabling signal corresponding to the sensed characteristic;
an alerting circuit coupled to receive the enabling signal, the alerting circuit generating an alert perceivable to a user if receiving the enabling signal; and
a display circuit coupled to the light source and including a manual switch coupled to activate a light source adjacent the aperture;
wherein light from the light source passes through the aperture and is incident on the surface, the incident light indicating on the surface a position of the object behind the surface.

50. The unit of claim 49, wherein the alert perceivable to the user is an audio tone.

51. The unit of claim 49, wherein the alert perceivable to the user is a visible symbol.

* * * * *